United States Patent [19]

Fiorentini

[11] Patent Number: 4,608,233
[45] Date of Patent: Aug. 26, 1986

[54] MIXING METHOD AND APPARATUS FOR PREPARING MULTI-COMPONENT PLASTIC MATERIALS ESPECIALLY POLYURETHANES

[75] Inventor: Carlo Fiorentini, Saronno, Italy

[73] Assignee: Afros S.p.A., Caronno Pertusella, Italy

[21] Appl. No.: 481,913

[22] Filed: Apr. 4, 1983

[30] Foreign Application Priority Data

Apr. 6, 1982 [IT] Italy ................. 20594 A/82

[51] Int. Cl.4 .............. C08F 299/06; B01F 5/20
[52] U.S. Cl. .................... 422/133; 422/224; 366/173; 521/917; 521/920
[58] Field of Search .............. 422/133, 224, 234; 366/173; 521/133, 917; 137/242; 222/145, 149, 318; 425/217; 521/920

[56] References Cited

U.S. PATENT DOCUMENTS

| | | |
|---|---|---|
| 3,306,587 | 7/1964 | Schroedter ............... 366/173 |
| 3,627,706 | 12/1971 | Chant .................... 422/133 |
| 3,881,701 | 5/1975 | Schoenman et al. ........ 422/224 |
| 3,883,121 | 5/1975 | Guillaud ................. 366/173 |
| 3,885,438 | 5/1975 | Harris, Sr. et al. ....... 73/863.81 |
| 3,934,742 | 1/1976 | Tennis ................... 137/596 |
| 3,975,128 | 8/1976 | Schluter ................. 425/217 |
| 4,053,283 | 10/1977 | Schneider et al. . |
| 4,099,919 | 7/1978 | Leidal ................... 366/173 |
| 4,115,299 | 9/1978 | Muhle .................... 422/133 |
| 4,140,661 | 2/1979 | Connett et al. ........... 422/133 |
| 4,159,079 | 6/1979 | Phillips, Jr. ............ 239/112 |
| 4,166,163 | 8/1979 | DiBella et al. ........... 521/920 |
| 4,226,543 | 10/1980 | Schluter . |
| 4,314,963 | 2/1982 | Boden et al. ............. 422/133 |
| 4,332,335 | 6/1982 | Fiorentini . |
| 4,344,919 | 8/1982 | Kelterbaum ............... 422/133 |
| 4,361,407 | 11/1982 | Pellegrini ............... 422/133 |
| 4,378,335 | 3/1983 | Boden et al. ............. 366/173 |
| 4,379,122 | 4/1983 | Taubenmann ............... 422/133 |
| 4,398,827 | 8/1983 | Dietrich ................. 366/107 |
| 4,440,500 | 4/1984 | Schneider ................ 422/133 |
| 4,510,120 | 4/1985 | Bauer .................... 422/224 |

FOREIGN PATENT DOCUMENTS

| | | |
|---|---|---|
| 2036586 | 7/1980 | United Kingdom ........ 422/224 |
| 2090763 | 7/1982 | United Kingdom ........ 422/133 |
| 228708 | 2/1969 | U.S.S.R. ............... 366/173 |

Primary Examiner—David L. Lacey
Assistant Examiner—Titus B. Ledbetter, Jr.
Attorney, Agent, or Firm—Fleit, Jacobson, Cohn & Price

[57] ABSTRACT

A mixing method and apparatus for preparing multi-component plastic materials, especially polyurethanes, which are mixed before being fed into a mold. According to the invention, a first and at least a second main component are mixed by feeding them into a limited area of a mixing chamber through lateral inlet apertures symmetrically arranged with respect to a plane comprising the longitudinal axis of the chamber and in which a third or secondary component to be mixed is fed through a channel, opening in the chamber upstream of said inlet apertures and orientated so as to direct the flow of the third or secondary component towards said mixing area in the direction of flow of the mixture. A control member is moved toward an advanced position so that it closes the inlet apertures to interrupt feeding of the first and second main components and a coloring agent through respective inlet apertures after a mixing operation.

11 Claims, 3 Drawing Figures

MIXING METHOD AND APPARATUS FOR PREPARING MULTI-COMPONENT PLASTIC MATERIALS ESPECIALLY POLYURETHANES

BACKGROUND OF THE INVENTION

This invention refers to a method and an apparatus for mixing and producing multi-component plastic materials, for example polyurethane to be fed into a mould, in which components are fed simultaneously in proportioned quantities, into a limited area of a mixing chamber.

Various attempts have been made to mix three or more components in a mixing head of the high-pressure type in which the components are fed, at high pressure and in proportioned quantities, to the respective nozzles which inject them through lateral inlet apertures situated in a limited area of a mixing chamber. Said inlet apertures are usually placed opposite each other or at the sides of an imaginary plane of symmetry so that the various atomized jets of components, colliding at high speed, mix thoroughly together. The arrangement of the injection nozzles opposite each other in the mixing chamber makes it possible in general to achieve a satisfactory degree of mixing and a suitable nozzle arrangement for just two components; therefore, mixing a third component together with the others proves difficult for various reasons, depending upon the disposition of the nozzle or of the inlet aperture of said component, or upon the feeding mode of the component itself.

Therefore, it was suggested to feed a certain number of components, unable to inter-react chemically, for example, by premixing them together in a storage tank, or by introducing one component into the feeding duct of another, before injecting them into the mixing chamber. None of these solutions have ever been able to fully satisfy the need for thorough and homogenous mixing of three or more components, as they give rise to a non-homogenous mixture and the consequent moulding of articles with faulty parts, for example, due to the presence of streaking or alterations in the physical and mechanical characteristcs of the moulded article.

Therefore, an aim of this invention is to provide a method for mixing several components, in particular for moulding polyurethane, in which the mixing of a third component, such as a colouring agent, a release agent or a different type of component, is carried out by such method and means as to enable the thorough and complete simultaneous mixing of all the components, without the need for substantial and expensive modifications or addition of devices or other parts to the mixing apparatus.

A further aim of this invention is to provide a multi-component mixing apparatus, operating according to the claimed method, which makes use of a usual mixing head, designed for the simultaneous mixing of components, making use of extremely simple and inexpensive means which ensure a high degree of mixing of the third component which is fed directly into the injection area of the other components in the mixing chamber.

SUMMARY OF THE INVENTION

According to the invention, a mixing method has been provided in the preparation of multi-component plastic materials, in particular polyurethane, comprising at least a first and a second main component able to react chemically together, which are fed under pressure into a limited portion of a mixing chamber through lateral inlet apertures, characterized by feeding a third or secondary component into said portion of chamber at a point upstream and close to said lateral inlet apertures of the main components and directing the flow of said third component into the mixing chamber, substantially in the direction of flow of the mixture.

Furthermore, according to the invention, there is provided an apparatus for the preparation of chemical components, in particular polyurethane materials, according to the previously claimed method, said apparatus comprising a mixing head having a mixing chamber provided with lateral inlet apertures for a first and a second component, characterized by the fact of comprising a feeding channel for a third component which opens out into the mixing chamber at a point upstream and close to said lateral inlet apertures for the first and second component, said feeding channel leading into the mixing chamber in a direction substantially parallel to the longitudinal axis of the chamber itself.

According to one specific embodiment, said channel is made in a control member sliding within the mixing chamber from a backward to a forward position, and communicates with an aperture connected to a feeding duct for said third component, when the control member is in its backward position.

The novelty or originality of the proposed solution lies mainly in the mode of feeding the third component, as the flow of material is substantially fed in the direction of flow of the mixture, parallel to and along the axis of the mixing chamber, or its limited portion into which the first and second components are injected. Thus, the flow of the third component is hit from both sides, in substantially opposite positions, by the jets of the other two components, in the area of maximum turbulence and kinetic energy of the mixture; consequently, the third component is totally dispersed and perfectly mixed by the dynamic action of the other components, thus obtaining a perfectly homogenous mixture, free from non-mixed portions, at the outlet of the mixing chamber.

BRIEF DESCRIPTION OF THE DRAWINGS

The invention will be illustrated in greater detail hereunder, by reference to the figures of the accompanying drawings in which.

DESCRIPTION OF THE INVENTION

Figures 1, 2:
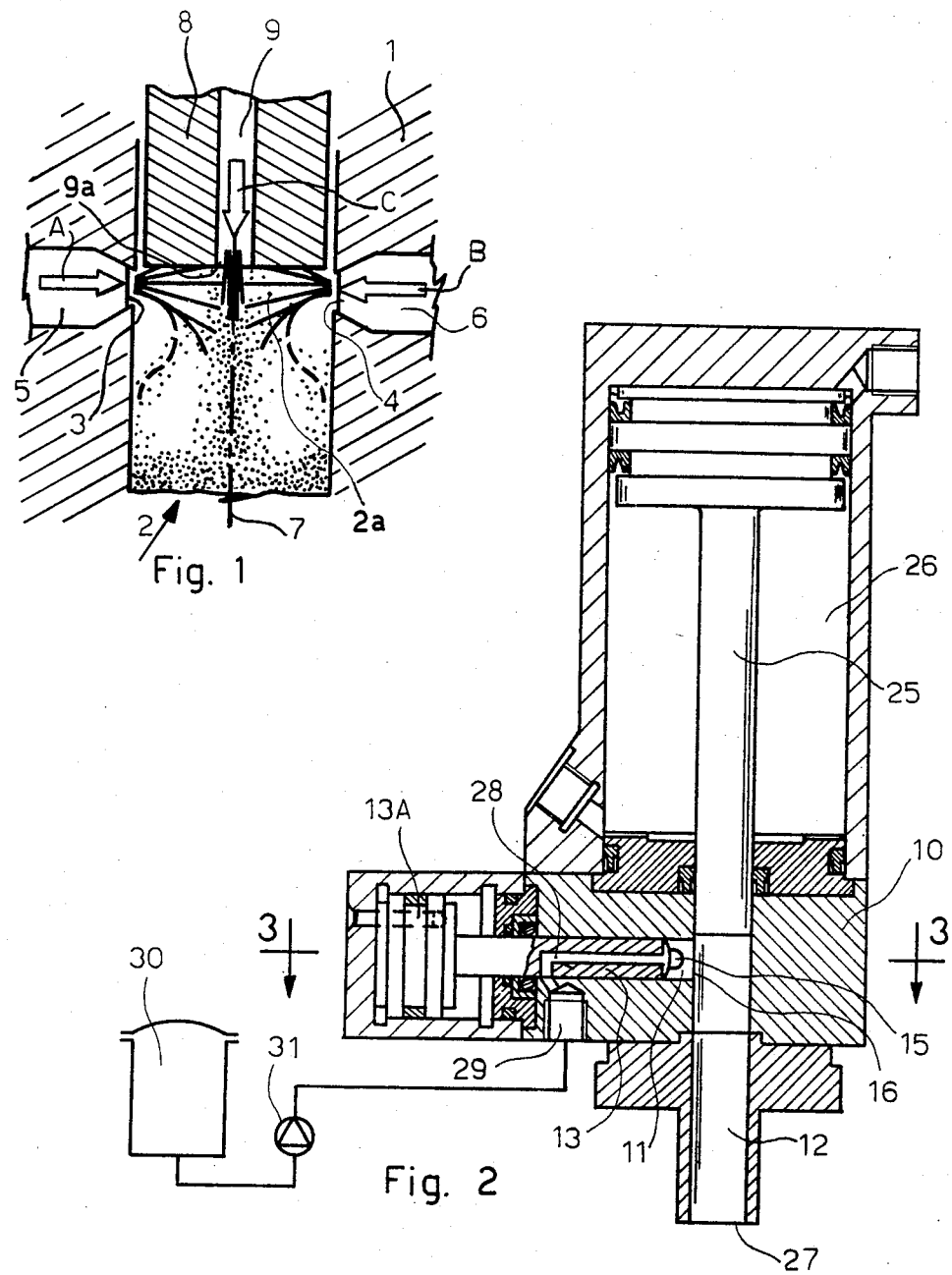
FIG. 1 shows a diagram illustrating the mixing method according to this invention.
FIG. 2 shows the longitudinal cross-sectional view of a mixing head, of the same applicant, embodying the principles of the invention.

Referring to FIG. 1, we will describe the general principles of the mixing method, according to the invention, for producing multi-component plastics. In order to simplify the explanation, we shall refer hereunder to the mixing of two chemical components A and B which interact in order to produce a polyurethane substance, to which is mixed a third component C, in the form of a colouring agent, without this being understood as restrictive in any way. FIG. 1 shows part of a mixing head 1, of the high pressure type, having a mixing chamber 2 of which is shown only the portion 2a, limited to the area of injection or introduction of the single components.

The mixing chamber presents, on its lateral surface, two opposing inlet apertures 3 and 4 for a first chemical component A and, respectively, for a second chemical component B, which are fed under high pressure to their respective nozzles 5 and 6 aligned with the aforementioned inlet apertures; the nozzles inject the components A and B into the chamber 2, in the form of highly atomized or finely separated jets, in the direction shown by the arrows.

Preferably, the component inlet apertures 3 and 4 in the mixing chamber, are diametrically opposite each other, or more generally are situated on opposite sides of an imaginary longitudinal plane of symmetry 7 comprising the axis of the same mixing chamber 2 and/or 2a.

In the known types of mixing heads, the two jets of components A and B, by colliding together with high kinetic energy, mix thoroughly together creating an area of considerable turbulence which aids the subsequent mixing before the mixture itself, thus formed, leaves the chamber and is fed into a mould.

Whenever a third component C has to be mixed in, for example a substance for colouring the mixture, according to the invention, a channel 9 is provided in the head 1 or in an associated portion thereof, such as for example a per se known sliding member 8, (partially shown) which moves from a backward to a forward position to open and close the inlet apertures 3 and 4 of the components A and B; the channel 9 presents an end rectilinear section which opens out into portion 2a of the mixing chamber 2, at a point situated upstream of the inlet apertures 3 and 4 for the components A and B, in the close vicinity of the aforesaid inlet apertures 3 and 4.

As shown, the feeding channel 9 of the third component C, or its end portion, is directed parallel to the longitudinal axis of the mixing chamber or portion 2a of mixing chamber 2, and more generally, the axis of the outlet aperture of the channel 9 lies on the aforesaid plane of symmetry 7 and preferably in a plane substantially tangent to the lateral or opposed inlet apertures 3 and 4. In particular, in the case of a symmetrical and diametrically opposed arrangement of the inlet apertures 3 and 4 for components A and B, the feeding channel 9 for the third component C will result coaxial to the mixing chamber 2 or portion of chamber 2a, as previously mentioned, so as to feed in the component C as close as possible to the point of injection of the components A and B, perfectly symmetrical with respect to the jets of the aforesaid components, and substantially orientated in the direction of flow of the mixture. From tests carried out, it was noted that the symmetrical arrangement of the third component feeding channel 9, with respect to the inlet apertures 3 and 4 for components A and B, aids and improves the mixing process of the component C, which spreads evenly into the mass of mixed materials thus obtained. This homogenous mixing action can be explained by the fact that the symmetrical and orthogonal arrangement, or substantially so, of the two jets of components A and B with respect to the flow of component C, hits the latter from both sides, breaking it up into minute particles and spreading it evenly throughout the mass of mixed material, thanks also to the effect of the considerable turbulence generated locally; thus a perfectly coloured mixture is achieved.

Due to the fact that this flow of colouring agent C, is injected or fed in the same direction in which the mixed material moves, it helps to mix those portions of materials A and B which are still not perfectly mixed, and which could possibly form in correspondence with the central axis of the chamber, due to the shape and size of the chamber itself. To conclude, the axial feeding of the third component, in the direction of the mixture, not only makes it possible to achieve the homogeneous mixing of said third component into the mass of plastic material, but also helps to improve the final mixture.

In the case shown in FIG. 1, the feeding direction of the third or secondary component C is perfectly orthogonal to the feeding directions of the two main components A and B, however, these directions could also differ, that is to say, the feeding direction of the third componet C could form an angle of more or less than 90° with the feeding directions of the components A and B, by pointing the axes of the injection nozzles or of the inlet apertures 3 and 4 upwards or downwards, as long as a symmetrical or substantially symmetrical arrangement is kept, with respect to the feeding direction of the aforesaid secondary component C.

As a relatively low pressure is generated in the mixing chamber, due to the fact that the maximum drop in the feeding pressure of the components A and B takes place in the injecting nozzles 5 and 6, the third component C can be fed with a relatively low pressure and slightly higher than that in the chamber or injection area 2a, however in certain cases it is preferable to circulate the third component at a relatively high pressure as well, providing suitable throttles or valves in order to better meter the same in relation to the other components.

Figure 3:
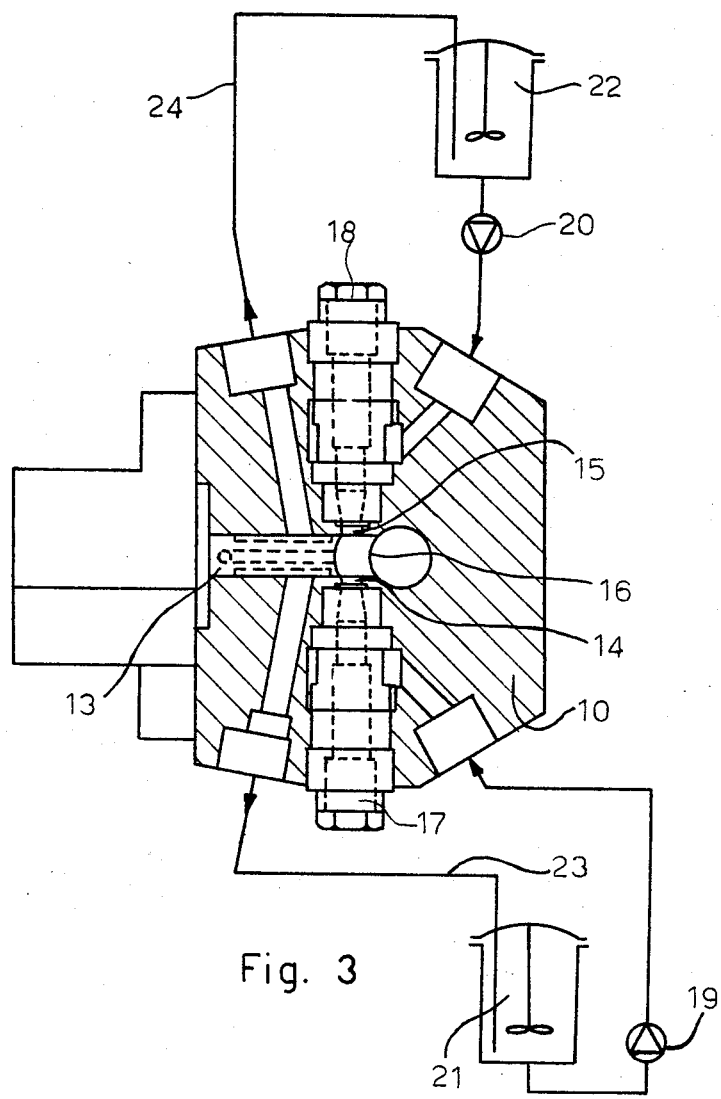
FIG. 3 is a cross-sectional view along the line 3—3 of FIG. 2.

The mixing chamber may be of any shape whatsoever, for example, it may be linear, angular or L-shaped, as the case may be, as long as a substantially symmetrical feeding condition of main components, as previously illustrated, is always respected. FIGS. 2 and 3 of the drawings show the embodiment of the invention into a mixing apparatus comprising a mixing head with an L-shaped chamber, described in a previous patent application of the same applicant; however what is described hereunder applies, in general, to any mixing head of the high pressure type.

The mixing head comprises a body 10 defining an L-shaped mixing chamber, having a first chamber portion 11 of small dimensions and of limited diameter with respect to the second portion 12 of the mixing chamber, arranged at an angle, for example at 90° with the latter, in which the mixing of the components is completed and which serves to convey the mixture towards a mould, not shown.

Sliding along the first portion 11 of the mixing chamber, is a control member in the form of a plug 13 operated by a double-acting cylinder 13A, to move said plug 13 from a backward or retracted position, as shown, in which it frees or opens the inlet apertures 14 and 15 of the main components A and B, to a forward or advanced position in which it closes said apertures 14 and 15 and in which it closes the aperture 16 through which the chamber portion 11 opens out into and communicates with the chamber portion 12. As shown, each of the two inlet apertures 14 and 15 of the components A and B is coupled with a corresponding injecting nozzle 17 and, respectively, 18 to which a metering pump 19,20 feeds under high pressure, the chemical component contained in tanks 21 and 22. Each component A and B can be recycled separately to the tank 21,22 through a respective recycling line 23,24 which may communicate with the respective nozzle 17,18 for example by means of a side channel made on the surface of the control member 13, as shown, or in another suitable way.

A second control member 25, in the example shown, in the form of a plug operated by a double-acting cylinder 26, slides lengthwise in the portion 12 of the mixing chamber, correlatedly with the control member 13 of the other portion 11 of chamber. This second member also slides from a backward position, as shown, in which it frees the apertures 16 of the chamber portion 11 towards the chamber portion 12, to a forward position, not shown, in which it closes the outlet 27 of the mixing chamber.

According to the invention, and as shown in the aforesaid figures, the third component C to be mixed with the main components A and B is fed, according to the described mode, through a channel 28 made coaxially in the control member 13. This channel 28 is aligned with the axis of the chamber portion 11, and with one of its ends opening out towards the aforementioned chamber, whilst with the other end it communicates with a feeding duct or passage 29 for feeding the component C to the mixing head 10, when the first control member 13 is in its backward position shown in the figures; in the other position of the member 13, this connection is interrupted. Reference 30 in FIG. 2 shows the tank of the third component C which is fed by means of a metering pump 31. The arrangement of the feeding channel 28 for the third component in the plug 13, proves to be extremely advantageous as it makes it possible to carry out the mixing method according to the invention, with extremely simple means and such as to bring the outlet of said third componet C as close as possible to the jets of the other two main components A and B with the end surface of the plug 13 in a plane substantially tangent to the lateral or opposed inlet apertures 14 and 15 so as to exploit the turbulence created by them to the highest degree possible, in order to achieve a more homogenous and complete mixing of all the components.

What is claimed is:

1. A method for uniformly mixing first and second chemically interactive main components and a colouring agent to produce a multi-component coloured plastic material, which method comprises the steps of:
   disposing a control and cleaning member for movement along an axis of a mixing chamber toward and away from an output end of the mixing chamber;
   moving the control member to a retracted position in which the control member opens first and second inlet apertures on sides of the mixing chamber that are opposite each other and connects a third inlet aperture, located adjacent the movable control member upstream from the mixing chamber, to a passage in the control member;
   supplying the first and second chemically interactive main components under pressure to respective ones of the first and second inlet apertures of the mixing chamber so that the main components feed into the mixing chamber and collide with each other when the control member is moved to its retracted position;
   supplying the colouring agent to the third inlet aperture under pressure, so that when the moveable control member is moved to its retracted position, the colouring agent feeds through the upstream third inlet aperture into the passage in the control member and into the mixing chamber at a position located essentially between the first and second inlet apertures in the mixing chamber, and along the axis of the mixing chamber toward the output end thereof, to mix the first and second chemically interactive main components and the colouring agent uniformly in the mixing chamber; and
   moving the control member toward an advanced position adjacent the output end of the mixing chamber so that the control member closes the inlet apertures to interrupt the feeding of the first and second chemically interactive main components and the colouring agent through their respective inlet apertures after a mixing operation.

2. A method as claimed in claim 1, in which the flow of the colouring agent is in a substantially parallel direction to the axis of the mixing chamber.

3. A method as claimed in claim 1, in which the feeding direction of the flow of the colouring agent coincides with a longitudinal axis of symmetry of the mixing chamber.

4. A method as claimed in claim 1, in which the colouring agent is fed in a direction forming an angle of substantially 90° with the axes of the material inlet apertures for the main components.

5. Apparatus for uniformly mixing first and second chemically interactive main components and a colouring agent to produce a multi-component coloured plastic material, which apparatus comprises:
   a mixing head including a mixing chamber having an output end and having first and second inlet apertures that are opposite each other for the first and second chemically interactive main components;
   a control and cleaning member mounted in the mixing head so that it has a reciprocable movement along an axis of the mixing chamber, the control and cleaning member including a colouring agent feed channels having at least a portion thereof extending longitudinally through the control and cleaning member and axially at one end into the mixing chamber essentially between the first and second inlet apertures in the mixing chamber when the control and cleaning member is in a retracted position;
   a third inlet aperture in the mixing head adjacent the control and cleaning member and upstream from the mixing chamber;
   means for supplying the first and second chemically interactive main components under pressure to their respective first and second inlet apertures in the mixing chamber so that they collide with each other;
   means for supplying a colouring agent under pressure to the third inlet aperture in the mixing head; and
   means for moving the control and cleaning member between an advanced position in which the control and cleaning member closes all of the inlet apertures to prevent the feeding of the first and second components and the colouring agent into the mixing chamber, and a retracted position for a component mixing operation in which the control and cleaning member opens the first and second inlet apertures and permits flow of the first and second chemically interactive components into the mixing chamber, and connects the other end of the feed channel in the control and cleaning member with the upstream third inlet aperture to permit flow of the colouring agent through the feed channel into the mixing chamber, the control and cleaning member, upon being moved from the retracted position toward the advanced position by the moving means, also closing all of the inlet apertures to interrupt flow of the first and second main components and the colouring agent into the mixing chamber.

6. An apparatus as claimed in claim 5, in which said feed channel for the colouring agent comprises an end portion of the control and cleaning member which opens into the mixing chamber substantially in the direction of the axis of the chamber.

7. An apparatus as claimed in claim 5, in which an end portion of the feeding channel in the control and cleaning member is aligned with an axis of a portion of the mixing chamber defining a limited area for injection of the main components.

8. An apparatus as claimed in claim 5, in which the mixing chamber is of a linear cylindrical configuration.

9. An apparatus as claimed in claim 5, in which the feeding channel for the colouring agent opens out in the mixing chamber, in a direction which forms an angle of substantially 90° with the axes of the lateral inlet apertures for said main components.

10. An apparatus as claimed in claim 5, in which the feeding channel for the colouring agent opens out in the mixing chamber on a plane substantially tangent to the lateral inlet apertures for the main components.

11. Apparatus for uniformly mixing first and second chemically interactive main components and a colouring agent to produce a multi-component coloured plastic material, which apparatus comprises:

a mixing head including an L-shaped mixing chamber having a first cylindrical mixing chamber portion and a second cylindrical mixing chamber portion larger than and angularly oriented to the first mixing chamber portion, the first mixing chamber portion having first and second lateral inlet apertures on sides thereof that are opposite to each other and having an output end opening into the second mixing chamber portion;

a first control member mounted in the mixing head so that it has a reciprocable movement along an axis of the first mixing chamber portion between an advanced position in which the control member prevents the feeding of first and second components and a colouring agent into the mixing chamber, and a retracted position for a component mixing operation, the first control member including a colouring agent feed channel having at least a portion thereof extending longitudinally through the control member and axially opening into the first mixing chamber portion, essentially between the first and second inlet apertures in the first mixing chamber portion when the first control member is in its retracted position;

a third inlet aperture in the mixing head adjacent the first control member and upstream from the first mixing chamber portion;

a second control member mounted in the mixing head so that it has a reciprocable movement in the second mixing chamber portion between an advanced position in which the second control member closes the output end of the first mixing chamber portion, and a retracted position in which the mixed material can be delivered from the output end of the first mixing chamber portion into the second mixing chamber portion;

means for supplying the first and second chemically interactive main components under pressure to their respective first and second inlet apertures in the first mixing chamber portion so that they collide with each other;

means for supplying the colouring agent under pressure to the third inlet aperture in the mixing head; and respective moving means for moving the first and the second control members from their advanced positions to their retracted positions so that the first control member opens the first and second inlet apertures and connects the feed channel in the first control member with the upstream third inlet aperture to permit flow of the first and second chemically interactive main components and the colouring agent, respectively, into the mixing chamber, and so that the second control member opens the output end of the first mixing chamber portion;

the moving means for the first control member being also for moving the first control member toward its advanced position so that the control member closes all of the inlet apertures and thereby interrupts flow of the first and second main components and the colouring agent into the first mixing chamber portion.

* * * * *